United States Patent [19]
Luskin et al.

[11] Patent Number: 5,812,987
[45] Date of Patent: Sep. 22, 1998

[54] INVESTMENT FUND MANAGEMENT METHOD AND SYSTEM WITH DYNAMIC RISK ADJUSTED ALLOCATION OF ASSETS

[75] Inventors: Donald L. Luskin, Menlo Park; Lawrence G. Tint, Atherton, both of Calif.

[73] Assignee: Barclays Global Investors, National Association, San Francisco, Calif.

[21] Appl. No.: 404,190

[22] Filed: Mar. 13, 1995

Related U.S. Application Data

[63] Continuation-in-part of Ser. No. 108,438, Aug. 18, 1993, abandoned.

[51] Int. Cl.$^6$ ............................................. B06F 17/30
[52] U.S. Cl. ............................................. 705/36
[58] Field of Search ........................ 395/236, 237, 395/235; 705/36, 37, 35

[56] References Cited

U.S. PATENT DOCUMENTS

| | | | |
|---|---|---|---|
| 4,752,877 | 6/1988 | Roberts et al. | 395/235 |
| 4,953,085 | 8/1990 | Atkins | 395/236 |
| 5,101,353 | 3/1992 | Lupien et al. | 395/237 |
| 5,126,936 | 6/1992 | Champion et al. | 395/236 |

OTHER PUBLICATIONS

"Moneyfor Mutual Funds", Direct Mail Packet, Moneyfor Management, Inc., New Jersey, May 8, 1989.
"Moneyfor Broker Dealer Owner Participation Executive Summary", Moneyfor Management, Inc., New Jersey, 1989.
Kleinholz, Lisa, "Can Software help you get rich?", Home Office Computing vol. 8, No. 8, pp. 30–32, Aug. 1990.

*Primary Examiner*—Bryan Tung
*Attorney, Agent, or Firm*—Fenwick & West LLP

[57] ABSTRACT

An invention for managing assets in one or more investment funds over a specified time. A fund comprises a plurality of assets (e.g., stocks bonds, currencies, gold, silver, oil, gas). A time horizon $H_t$ representing the expected date at which cash will be withdrawn from the fund is associated with each fund. A time $L_H$ represents the length of time remaining between the present time and the horizon time $H_t$. A risk tolerance, $R_t$, changes as a function of the decreasing time to horizon $L_H$. Typically, the risk tolerance decreases as the fund approaches the time horizon $H_t$ (e.g., investments become more conservative toward the end of the life of the fund). A strategic investment mix of assets in the fund is periodically determined as a function of the changing risk, $R_t$. Investment modifications are accordingly made in the mix of assets in the fund. In one embodiment, a fund also includes a tactical investment strategy component (e.g., representing 25% of the overall investment strategy). The tactical investment strategy is based on the strategic investment mix. Typically, the percent of strategic investments directed to equity-type assets is used to define the percent of tactical investment that is directed to a first tactical investment allocation strategy. The remaining tactical investment amount is directed to a second tactical investment allocation strategy.

16 Claims, 9 Drawing Sheets

INVESTMENT FUND MANAGEMENT METHOD AND SYSTEM WITH DYNAMIC RISK ADJUSTED ALLOCATION OF ASSETS

CROSS-REFERENCE TO RELATED APPLICATION

The application is a continuation-in-part of U.S. patent application Ser. No. 08/108,438, "Investment Fund Management Method and System," by Luskin et al., filed Aug. 18, 1993 now abandoned, which subject matter is incorporated herein by reference.

BACKGROUND OF THE INVENTION

1. Field of the Invention

The present invention relates generally to computer management systems, and specifically to the field of investment fund management systems.

2. Background of the Invention

Long-term investment plans, such as pension plans, enable an investor to save for retirement. Pension plans typically are divided into two types: defined benefit plans; and defined contribution plans. A defined benefit plan involves a promise made by an employer of a lifetime definite benefit paid to the recipient after retirement. The employer funds the promise by investing in trust for the recipient. In a defined contribution plan, the employer and/or the employees contribute a definite amount of money to an investment plan. The benefit paid after retirement is uncertain; it is determined by the performance of the investment plan. 401K plans are an example of defined contribution plans.

In a typical defined contribution plan, the employer establishes a group of investment funds of specified characteristics, from which the employee may select. The group of funds typically is diverse, including funds specializing in bonds, stocks, money markets, currencies, cash, gold, silver, oil, gas, or other precious metals and minerals, and other asset classes, or combinations of asset classes. These funds may be collective investment funds or mutual funds, managed by the employer or by a third party.

An employee typically invests in a fund having characteristics matching his or her investment preferences, such as high-risk/high expected return or low-risk/low expected return. Over time, as the employee's investment preferences change, that employee may move his or her investment from one fund to another to reflect a change in preferences. But because the typical employee generally is not a trained investment expert, it is possible that sub-optimal selections may be made from among the funds, and that the selections are not optimally revised over time.

Many employees in defined contribution plans do not appreciate that investments with high-risk and high expected return—such as equity securities—may be appropriate even for risk averse investors if their time horizons are sufficiently far in the future, and if the investment is properly diversified. Thus, many employees tend to invest more conservatively than an investment expert would do under like circumstances. Because conservative investments generally have low returns over the long term, an unnecessarily risk-averse strategy may be expected to produce disappointing long-term performance.

Many employees in defined contribution plans do not possess sufficient expertise to select investment funds to match their risk preferences, even when their risk preferences are appropriate. As a result, investments may be selected that either expose an employee to unexpected risks, or expose the employee to unexpectedly low returns.

Finally, many employees in defined contribution plans do not possess sufficient expertise, or wish to devote sufficient time and attention, to appropriately revise their selection of funds as market conditions change, and as their own life circumstances change. If an employee neglects to revise his or her investments, or revises them inappropriately—perhaps due to emotions of fear or greed—that employee will be exposed to unexpected and inappropriate risks when market conditions change, or when his or her own life circumstances change.

The typical employee generally is unwilling to pay the costs to obtain private professional investment advice, or may be unaware that it is available. The typical employer generally is unwilling to provide advice to employees, either due to a lack of sufficient expertise, or due to an unwillingness to bear potential legal liabilities. Thus, there remains a need for a system and method for a typical employee in a defined contribution plan to make appropriate investments, to reflect appropriate long-term trade-offs of risk and return, to select investments that accurately reflect those trade-offs, and to revise those investments through time in response to changing market conditions and the employee's changing preferences.

SUMMARY OF THE INVENTION

The present invention relates to a method and system for managing assets in one or more funds over a specified life of the fund. A fund $F_n$ has associated therewith a plurality of assets. Assets may be, for example, bonds, stocks, money markets, cash, gold, silver, oil, gas, other precious metals and minerals, and the like. A time horizon $H_t$ is associated with each fund $F_n$. The time horizon $H_t$ defines the expected date at which cash may need to be withdrawn from the fund and has an associated parameter $L_H$ representative of the length of time remaining between the present and the time horizon $H_t$. The investment mix of a fund is strategically adjusted at periodic intervals in accordance with some criteria that are related to the diminishing length to time horizon $L_H$. The criteria may include a risk level $R_I$ that changes as a function of the remaining length to time horizon $L_H$ associated with each fund. Typically, the risk value decreases as the fund approaches the time horizon $H_t$ (e.g., investments become more conservative towards the end of the life of the fund).

In one embodiment, a fund has both a strategic investment strategy, as described above, and a tactical investment strategy. In a preferred embodiment, 75% of the investment strategy (e.g., cash, 401K, or other investments) is based on the strategic investment component, and 25% is based on the tactical investment component. The tactical investment strategy is based on the strategic investment mix. Typically, the percent of strategic investments directed to equity-type assets is used to define the percent of tactical investment that is directed to a first tactical investment allocation strategy (e.g., as defined by the Wells Fargo Tactical Asset Allocation). The percent of strategic investments directed to non-equity-type assets is used to define the percent of tactical investment that is directed to a second tactical investment allocation strategy (e.g., as defined by the Wells Fargo U.S. Treasury Asset Allocation).

The asset management system and method of the present invention is implemented in a conventional computer system comprising a processor, storage,. and memory. A software program implemented in the memory and executed on the processor of the computer controls the asset management system. Adjustments in the mix of the fund involve physically selling or buying tangible assets (e.g., stocks, bonds, paper, currencies, gold, silver, precious metals and minerals, oil, gas) on the open market.

DESCRIPTION OF THE PREFERRED EMBODIMENTS

The present invention is a system and method for managing assets in investment funds wherein each fund has a fixed time horizon $H_t$ and a diminishing length to horizon $L_H$. That is, the fund is managed by manipulating the investment mix of the fund in accordance with some criteria related to the diminishing length to horizon $L_H$ of the fund.

Generally, the method includes establishing an investment fund $F_n$ with an associated fixed time horizon $H_t$ and a diminishing length to horizon $L_H$. A relationship is established between at least one investment asset and the fund in accordance with a first set of criteria. Assets may be, for example, stocks, bonds, paper, currencies, gold, silver, precious metals and minerals, oil, gas and the like. Such tangible assets are physically bought and possessed, and/or sold and disposed of on the open market. One or more assets may be associated with a portfolio, which portfolio may be in some relationship with the fund. Cash may be directed to selected ones of the assets or portfolios to establish an investment mix for the investment fund. Cash, as used herein, may refer to any assets of value. According to the invention, the investment mix is adjusted as a function of the diminishing length to horizon $L_H$ of the investment fund $F_n$. Thus, as the investment fund matures, the investment mix is changed.

One exemplary manner in which the investment mix may change over the life of the fund is to change the distribution of new cash across the portfolios as such cash is invested in the fund or otherwise becomes available. Another manner is to change the asset or portfolio mix by exchanging assets or portfolios having one type of characteristic for assets or portfolios having a different type of characteristic. Typically, the investment strategy of an investment fund will become more conservative as it approaches maturity and the distribution of cash among the assets or the mix of portfolios reflects that change in the fund.

Figure 1:
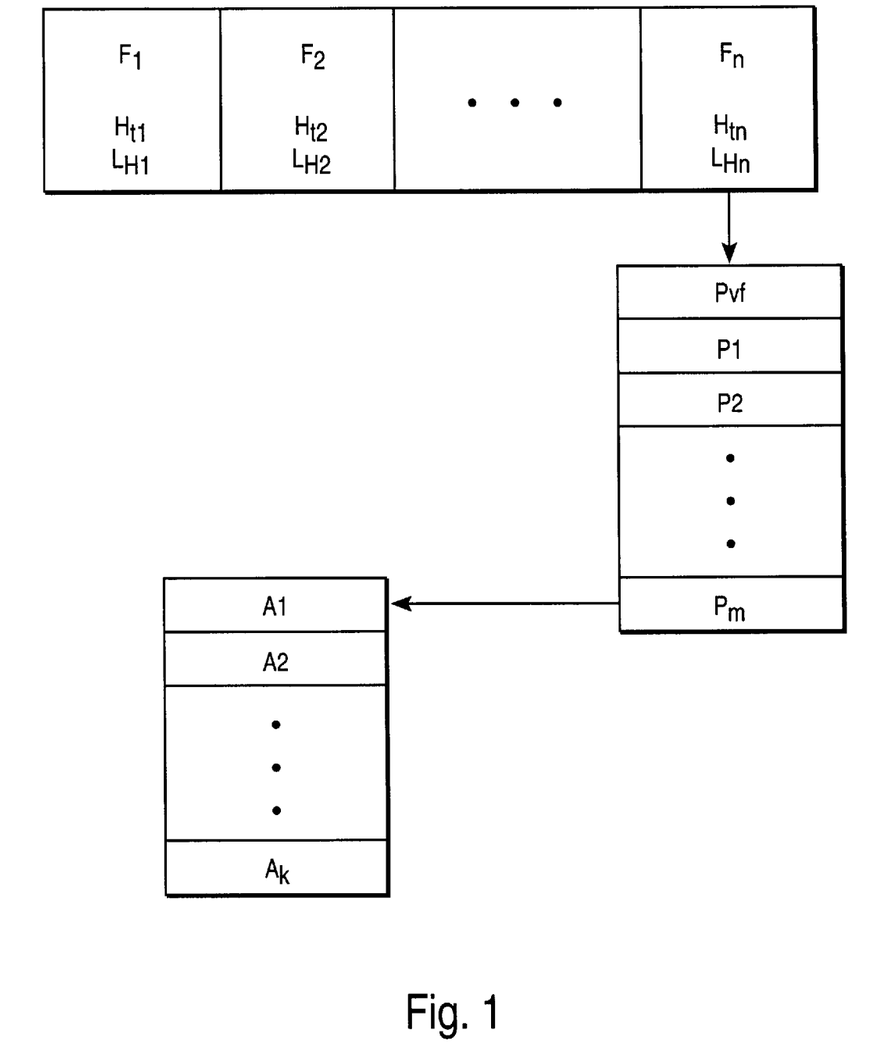
FIG. 1 illustrates an exemplary investment fund structure embodying the present invention.

FIG. 1 graphically depicts an exemplary investment fund structure embodying the present invention. As shown, a plurality of investment funds $F_n$ are made available to individual investors. Each fund has an associated time horizon $H_t$, which indicates the date that the individual investor anticipates receiving money from the fund. The time horizon $H_t$ preferably is expressed in terms of a specific calendar date for maturity. Also associated with each fund $F_n$ is a length to horizon $L_H$ which represents the remaining time between the present and the time horizon $H_t$.

In an alternative embodiment, each fund $F_n$ also may have an associated risk value R, representative of whether the fund generally represents a conservative or aggressive investment strategy. The risk R of a fund $F_n$ provides individual investors with information about the fund to assist tailoring their investments in accordance with their own risk preferences. In another embodiment, an individual investor may impose other constraints for a particular fund, such as designation of allowable investments. For example, an investor may designate that an investment should consist only of domestic investments, or an investment should contain a predominant portion of investments directed to a specified technology or industry. In this manner, some funds of a specific time horizon $H_t$ may be established which are tailored in accordance with investor-specified attributes.

A relationship may be established between one or more investment portfolios $P_m$ and each investment fund $F_n$. The portfolio $P_m$ has an associated portfolio characteristic, or parameter, that may be predetermined either by the fund manager, the market, or by the individual investor. The portfolio characteristic typically is determined by or defines the type of assets constituting the portfolio. These assets may be characterized by such factors as the expected volatility of the investments, the expected responsiveness to market conditions, and expected return on the investments. Thus, an investment fund $F_n$ having a particular time horizon $H_t$ typically consists of several portfolios, each portfolio having a different characteristic. Alternatively, a relationship is established between one or more investment assets $A_k$, without the use of a portfolio. In that embodiment, each investment asset $A_k$ is handled in a manner similar to a portfolio $P_m$.

The portfolios $P_m$ of FIG. 1 may each consist of one or more investment assets $A_k$, also called an asset mix, each representing a major asset class. These assets may be stocks, bonds, paper, currencies, gold, silver, precious metals and minerals, oil, gas and the like. Assets may be combined in a manner that achieves the predetermined portfolio characteristic.

Figure 2:
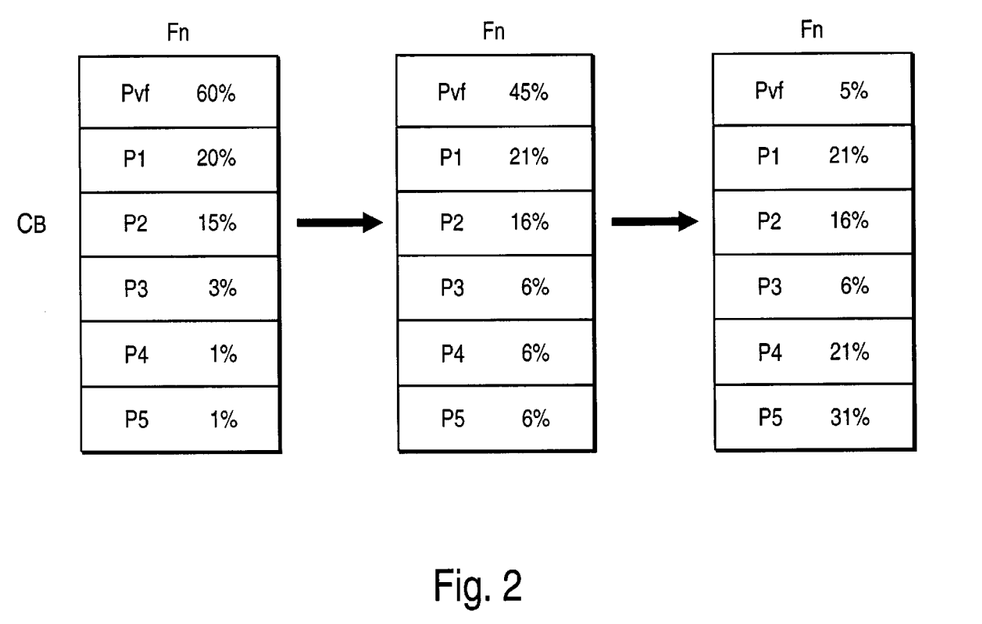
FIG. 2 illustrates a shift in distribution of cash among the portfolios of an exemplary fund, over the life of the fund, in accordance with the present invention.

In one embodiment, and as shown in FIG. 2, each fund $F_n$ may include a portion or value known as present value of future cash flow $P_{vf}$. This portion represents a "phantom asset", or the total value of all future cash flows that are expected to be received for the fund $F_n$. In that illustrated embodiment, the fund $F_n$ has a current balance $C_B$ representative of the current value of the portfolios ($P_1$–$P_5$), including any cash available for investing. Available cash is removed from the $P_{vf}$ as it becomes available for investing in the portfolios of the particular fund $F_n$.

One aspect of the present invention is maintaining a total fund balance, including $P_{vf}$ and $C_B$, of a particular fund, while changing the investment mix of that fund over the time horizon for that fund. One way in which the present system may administer the investment funds, each fund having a fixed time horizon, is to adjust the investment mix in accordance with some identified criteria.

In one embodiment of the invention, and as illustrated in FIG. 2, the investment mix is adjusted by adjusting the percentage of available cash distributed among the portfolios $P_m$ in each fund $F_n$. As shown, cash initially is invested in the portfolios $P_1$–$P_5$ in accordance with a certain percentage. In the illustrated embodiment, $P_1$ has a relatively high-risk characteristic, whereas $P_5$ has a relatively low-risk characteristic. While the fund is young, i.e., the $P_{vf}$ (60%) is greater than the cash balance $C_B$ (40%), the individual portfolios have a greater relative percentage of cash invested in the higher-risk portfolios $P_1$ and $P_2$. Over the maturity of the fund, the cash is distributed among the portfolios such that near the time horizon for the fund, the portfolios have a greater relative percentage of value invested in the lower-risk portfolios $P_4$ and $P_5$.

In a preferred embodiment, the change in distribution of available cash varies as a function of a risk tolerance $R_I$ which changes over the length to horizon $L_H$, as previously described. Other processes that consider the time horizon of the fund may be used in conjunction with the present system.

In another embodiment, the portfolio mix or asset mix for a given fund is adjusted as a function of the length to horizon $L_H$ by exchanging individual ones of the portfolios $P_m$ or investment assets $A_k$ for portfolios or investment assets having different characteristics. Typically the exchange is between portfolios or assets having higher-risk characteristics for ones having lower-risk characteristics. As with the illustrated embodiment of FIG. 2, these changes may be made as some function of the time horizon $L_H$ and risk tolerance $R_I$, depending on the particular system.

Figure 3:
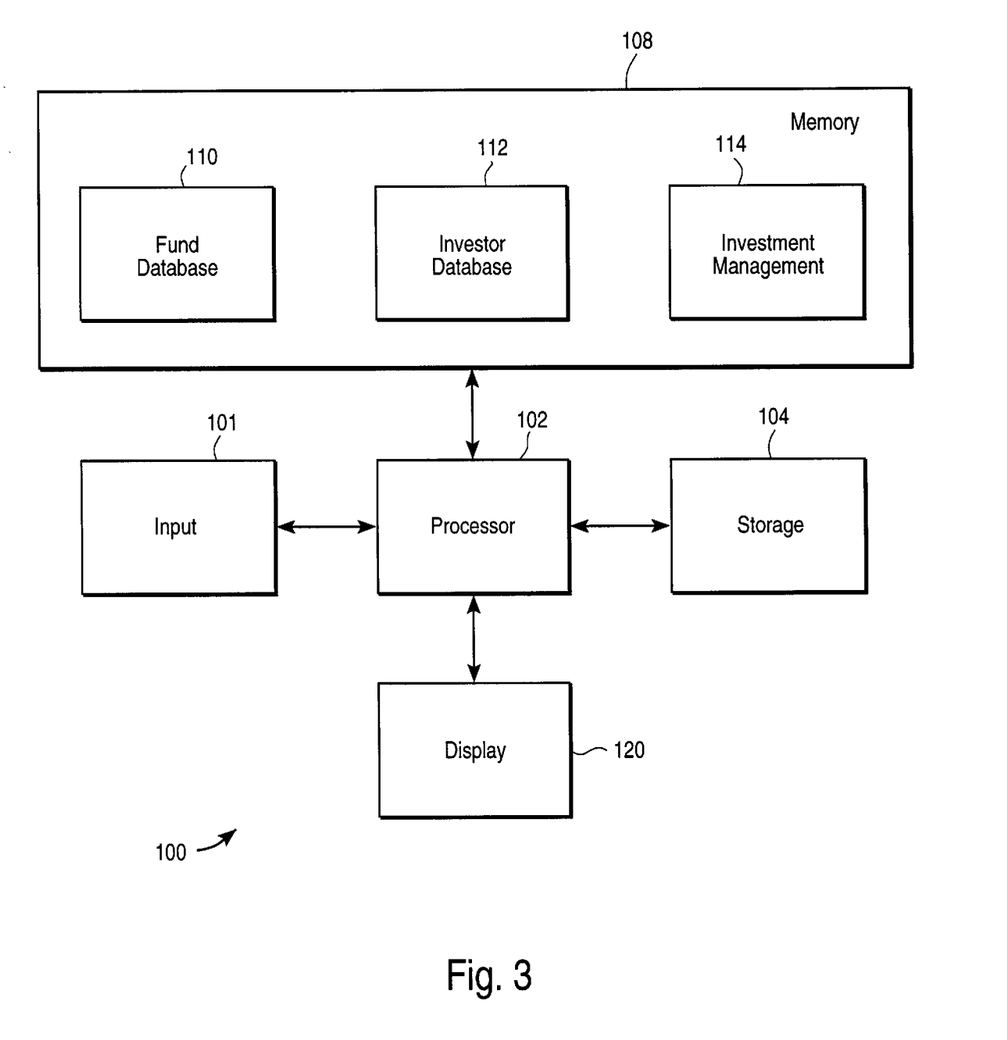
FIG. 3 is a block diagram of an exemplary data processing system embodying the present invention.

FIG. 3 shows a block diagram of software and hardware components for implementing one embodiment of the present invention 100. Processor 102 is a conventional engineering workstation or other computer processor such as an Intel 80x86 or Pentium central processing unit (CPU), Motorola 680x0 CPU, RISC CPU and the like. Processor 102 may also be coupled to other processors accessible over conventional communications channels or buses (not shown). Processor 102 is conventionally coupled to storage 104 which may be a magnetic disk storage, a CD storage unit, or other conventional computer data storage unit. Storage 104 may also be coupled to other storage units accessible over conventional communications channels or buses (not shown).

Processor 102 is also conventionally coupled to memory 108 which is a random access memory (RAM) unit or other conventional computer memory. Items in memory 108 may alternatively be stored in storage 104 and accessed by processor 102 when required. Memory 108 may comprise a fund database 110 for storage and retrieval of information related to various funds (e.g., $H_T$, $L_H$, $C_B$, $P_{vf}$, Risk Tolerance $R_I$, and portfolios $P_1$–$P_m$), investor database 112 for storage and retrieval of information related to various investors (e.g., risk preference; preferences or constraints on investments such as domestic investments only, environmentally conscious investments, technology areas of investment, or industry areas of investment), and a strategic investment module or program component 114 as discussed below. Strategic investment program comprises a plurality of program instructions executable on processor 102.

Input 101 comprises conventional input devices such as a keyboard, mouse, track-ball, or touchscreen. A conventional display unit 120 may also be conventionally coupled to processor 102.

The preferred embodiment of the present invention may be implemented on any platform, operating system, and user interface such as: IBM PC or Compatibles/Microsoft Windows; Sun/Sun OS-SunView; DEC VAX/VMS, and the like, and may be operated in a distributed data/distributed processor environment, if desired.

Figure 4:
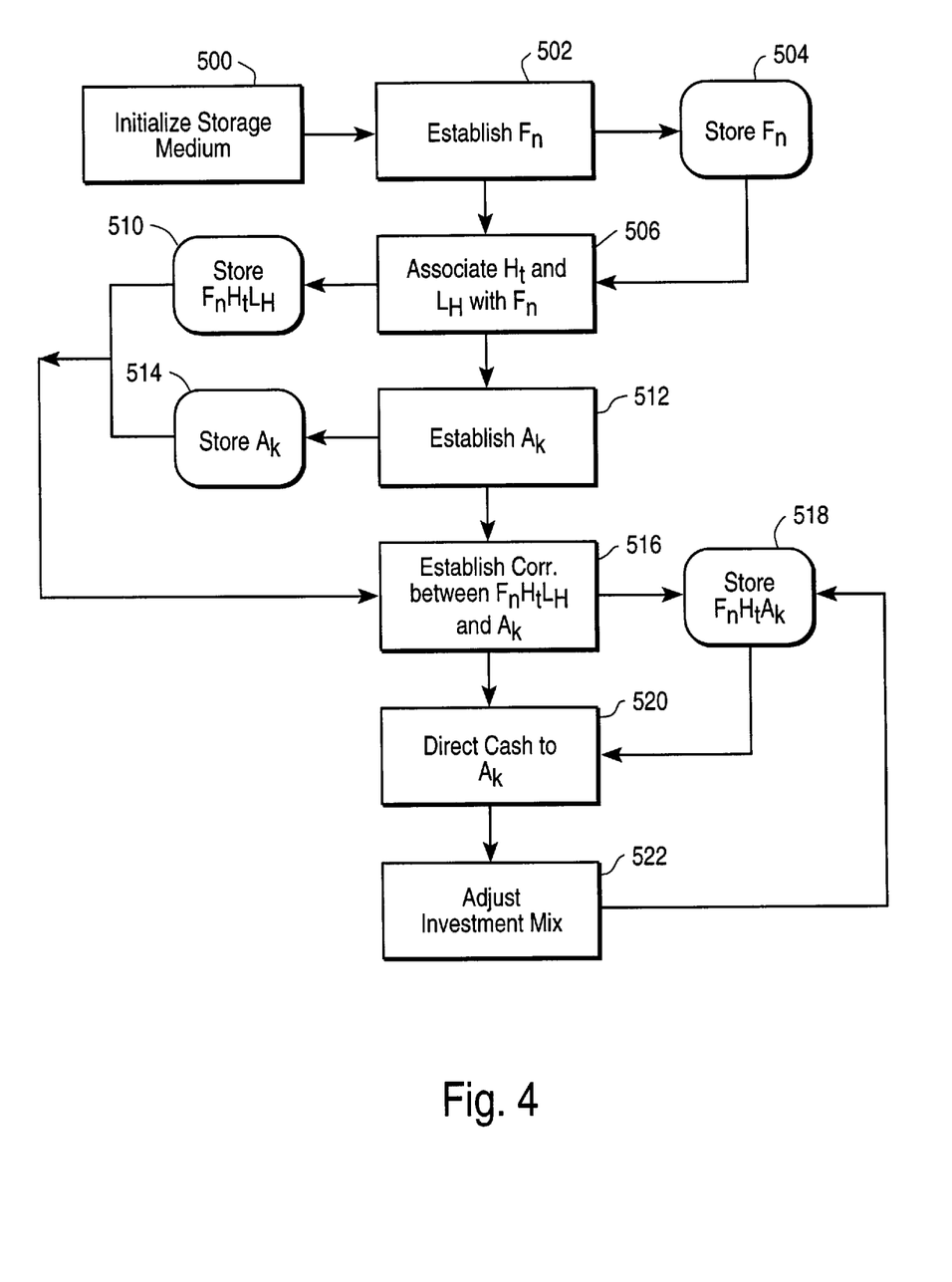
FIG. 4 is a flow chart illustrating one embodiment of the present invention.

FIG. 4 is a flow chart of one embodiment of the initialization process of the present system. One or more investment funds $F_n$ are established 502 and stored 504 in storage 104. A time horizon $H_t$ and a length to horizon $L_H$ are associated 506 with each of the stored investment funds $F_n$, and the data $F_n$, $H_t$, $L_H$ are stored 510 in storage 104. At the same time, or at a separate time, one or more investment assets $A_k$ may be established 512 and stored 514 in storage 104. These assets $A_k$ represent real tangible assets such as stocks, bonds, paper, currencies, gold, silver, precious metals and minerals, oil, gas and the like, which are bought on the market in order to establish the fund. Alternatively, step 512 may include establishing a portfolio $P_m$ having one or more assets $A_k$.

Each fund, $F_n$, is associated with one or more assets, $A_k$ (or $P_m$) 516, and stored 518 in storage 104. Cash or other contributions can then be directed 520 to the various investment assets $A_k$ (or portfolios $P_m$) associated with each fund $F_n$ and distributed among the assets $A_k$ (or portfolios $P_m$) as a function of the length to horizon $L_H$ associated with each fund $F_n$, as described in detail above. The initial distribution 520 of cash among the investment assets $A_k$ or portfolios $P_m$ establishes the investment mix, of each fund $F_n$. It is this investment mix that is adjusted 522 in accordance with some predetermined criteria, as described in further detail below, which criteria also is a function of the length to horizon $L_H$ associated with the fund $F_n$.

In a preferred embodiment, the investment mix of a fund $F_n$ is adjusted 522 as a function of the risk $R_I$, where $R_I$ varies with the length to horizon $L_H$ associated with the fund $F_n$. By associating the time horizon $H_t$ (or $L_H$) with a risk level or preference indicator, such as $R_I$, it is possible to decrease the amount of risk in investments over the life of a particular fund. For example, a fund $F_1$ that has an $H_t$ of 40 years may have an initial investment mix that has high expected risk because the investor has high risk tolerance $R_I$. Conversely, a fund $F_2$ may have an associated $H_t$ of 10, in which the $R_I$ is quite low, leading to conservative investment mix. The risk of the fund is conventionally determined by statistical variance analysis or fluctuation of the fund in relation to the market.

Figure 5A:
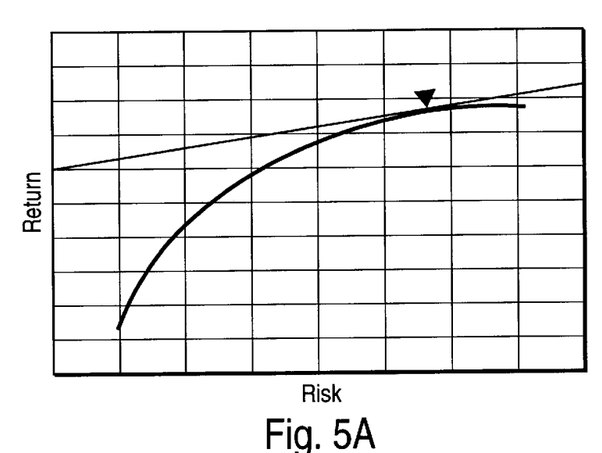
FIGS. 5A–5D are return-to-risk charts of exemplary funds managed in accordance with the present invention.
Figure 5B:
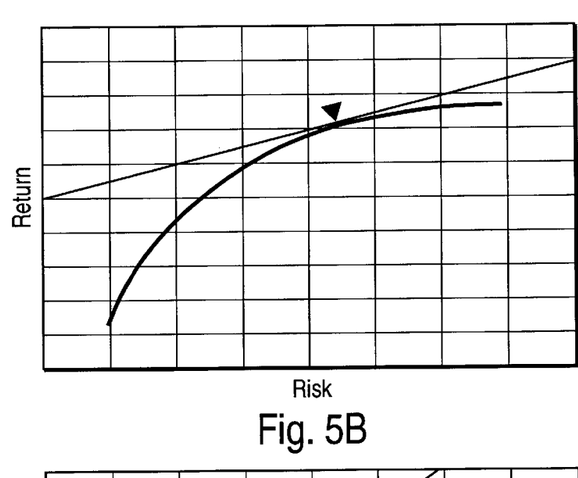
Figure 5C:
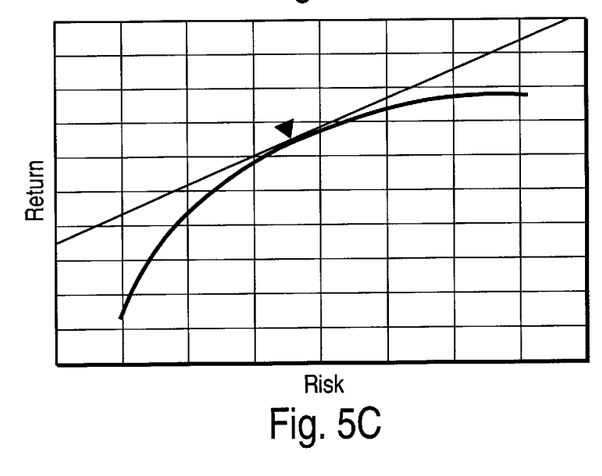
Figure 5D:
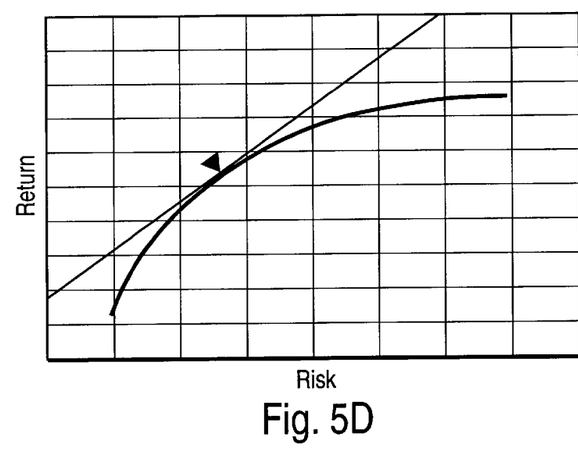

In practicing a preferred embodiment of the present invention, and as shown in FIGS. 5A–5D, once a fund $F_n$ is established, the risk tolerance $R_I$ shifts over time without transferring any cash out of the fund. The illustrated fund $F_n$ has a time horizon $H_t$ of 40 years. In the first year, FIG. 5A, the $R_I$ is high, thus the investment mix will reflect the aggressive investment approach. The investments mix is thus proportionately in higher-risk funds. Over time, as $L_H$ diminishes, the $R_I$ shifts and the investment strategy becomes more risk averse, as illustrated in FIG. 5B. Continuing, the $R_I$ decreases until a more conservative, or less aggressive, investment mix is achieved, as illustrated in FIGS. 5C and 5D. The investments mix is thus proportionately in lower-risk funds.

Figure 6:
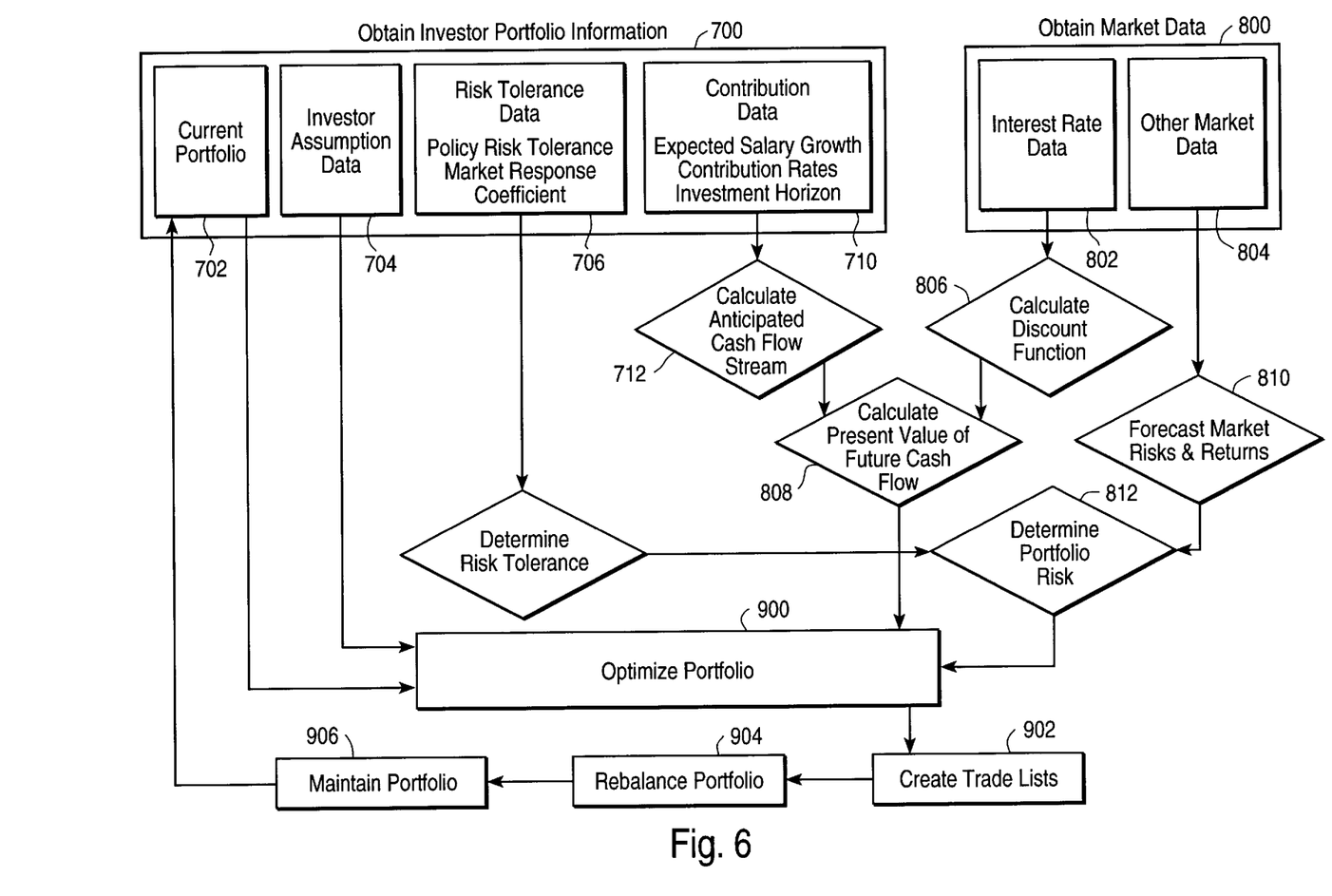
FIG. 6 is a flow chart illustrating one embodiment of the present invention.

FIG. 6 is a general flow chart of a preferred embodiment of practicing the adjusting step 522 of the present invention. In the illustrated embodiment, information is obtained 700 from an individual investor regarding investor portfolio information and market data 800 is obtained regarding the market. The step of obtaining 700 investor portfolio information includes establishing a current portfolio 702, which becomes the repository for assets and cash. Investor assumption data, such as investment preferences (domestic limitation, technology focus, industry focus, environment conscious, and the like) may also be obtained 704.

The step of obtaining 700 investor portfolio information also includes obtaining 706 risk tolerance data. Such data includes both the investor policy risk tolerance, which typically is a measure of an aggressive/conservative investment policy on behalf of the investor, and a market response coefficient, which typically is a measure of whether the investor is generally contrary, market neutral, or insurance oriented. A risk tolerance $R_t$ is determined 708, which is used in determining 812 portfolio risk, described in further detail below.

Finally, the step of obtaining 700 investor portfolio information may include obtaining 710 contribution data. That data may include such factors as the investor's current salary, expected growth rate of that salary, the investor's contribution rate, any matching funds contributed by a third source, the investment horizon $H_t$, plus any outstanding or current fund balance. Other factors may be included or omitted as appropriate for an individual investor or system. Each of these factors may be used, in combination or individually, to calculate 712 the anticipated cash flow stream for the investor.

The step of obtaining 800 market data preferably includes the steps of obtaining 802 interest rate data and obtaining 804 other market data. The step of obtaining 802 interest rate data may include calculating 806 some discount function that then may be used, in combination with the anticipated cash flow stream produced in step 712, to determine 808 the present value of future cash flow $P_{vf}$, in the form of future cash flows.

The step of obtaining 804 other market data may include determining market risk premiums, expected returns, and transaction costs associated with buying/selling portfolios and/or individual assets, which may include obtaining alphas for each portfolio and/or each asset. An alpha is defined as the difference between the investor's expected return and the observed market consensus expected return for any particular portfolio or asset. Other values may be obtained 804 as appropriate for the particular system and investors. The market data may be used to forecast 810 market risks and returns, and to determine 812 the portfolio risk.

The fund then is optimized 900 in accordance with any commercially available optimizer program or system, such as AAT, available from Scientific Press (So. San Francisco, Calif.). Inputs to an optimizer program 900 typically include a lower bound, which may be set to be that portion of the portfolio which represents the present value of all future contributions to the portfolio by the investor, or set in accordance with the investors' desired minimal exposure to an asset class or portfolio. Optimizers 900 typically also include an upper bound, which represents a maximum exposure that any investor wishes to have to one or more asset classes or portfolios. Other inputs of available optimizers typically include: asset and/or portfolio characteristics, such as expected returns risks, and correlations; transactions costs of all types; current holdings; and investor risk tolerance. Other parameters may be considered or omitted, depending upon the particular optimizer used in conjunction with the present invention.

The present system may further include creating 902 an investor trade list. The trade list may be in the form of output from the optimizer 900, and lists the assets that need to be exchanged to obtain an optimal mix of investments. The investor portfolio may then be rebalanced 904 by trading, selling and/or purchasing assets in the open market, then maintained 906 for a specified period, such as for one month. Typically, trade lists are a necessary part of the process even when trading activity is motivated by contributions or withdrawals of cash.

Figure 7:
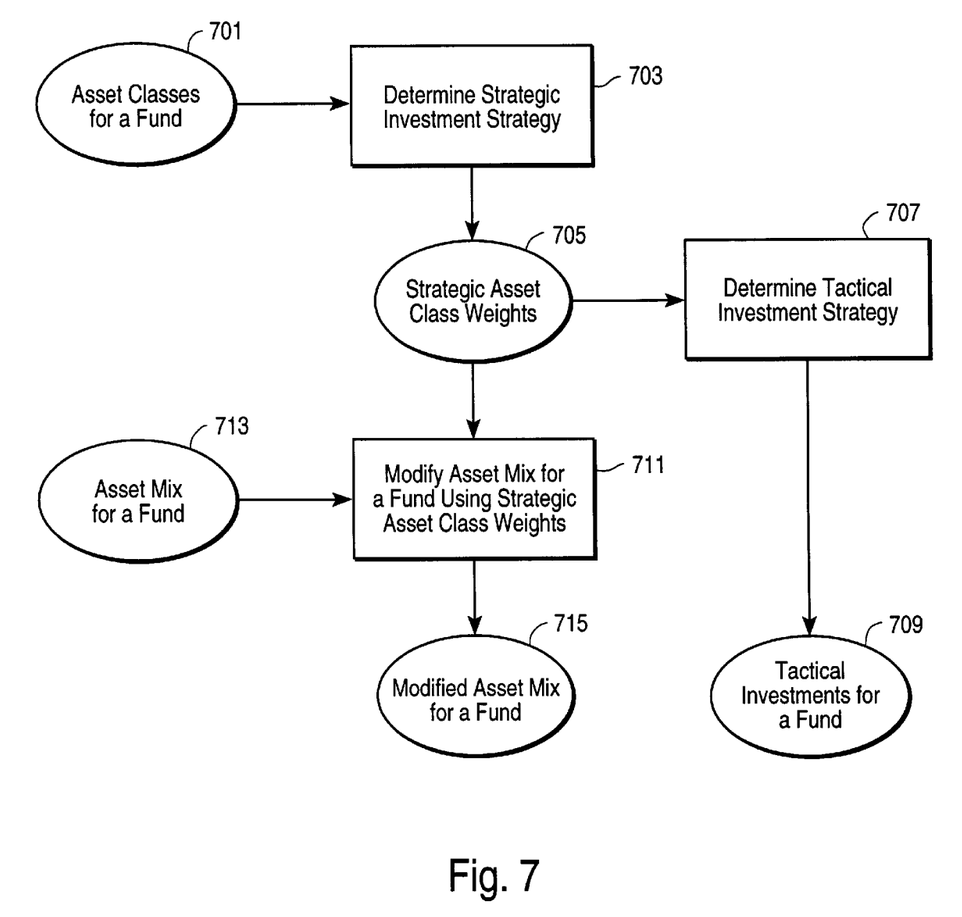
FIG. 7 is a high-level flow chart illustrating one embodiment of the investment management method of the present invention.

FIG. 7 illustrates a high-level flowchart of one embodiment of the investment management module 114 shown in FIG. 3. Current asset classes 701 for a fund are input to the system for processing. In a preferred embodiment, 17 asset classes 701, or style indices (which represent assets), are input as shown in Table I. Asset classes represent tangible commercial assets or goods such as bonds, stocks, money markets, currencies, cash, gold, silver, oil, gas, or other precious metals and minerals. As the investment mix changes according to the present investment, these goods are physically purchased or disposed of. Asset classes and style indices are used interchangeably herein.

TABLE I

Domestic Equity

Large Growth (Equity Growth)
Intermediate Value
Intermediate Growth
Intermediate Utilities
Small Value
Small Growth
Micro
International Equity MSCI EAFE x-Japan*
MSCI Japan
Domestic Fixed Income Intermediate Government
Long Government
Intermediate Corporate
Long Corporate
Mortgage Backed Securities
International Fixed Income Salomon non-US WGBI*
Cash Treasury Bills (MOEBT*)

*MSCI EAFE = Morgan Stanley Capital International Europe, Australia and Far East Index
MOEBT = Well Fargo money market fund
WGBI = World Government Bond Index The domestic equity style indices are a mutually exclusive and exhaustive set of style indices which combine (using capitalization weights) to form the US Equity Market Index. The domestic fixed income style indices are a mutually exclusive and exhaustive set of style indices which combine (using capitalization weights) to form the Lehman Brothers Aggregate Bond Index (minus asset backed securities). The international equity style indices combine to form the MSCI EAFE Index. The international fixed income index forms the Salomon Brothers non-U.S. WGBI. The final asset class is cash. Other similar asset classes or style indices 701 can also be used. It is assumed that expected returns, risks, and correlations of asset classes 701 change infrequently, and the markets are in equilibrium.

A strategic investment strategy is determined 703, which produces strategic asset class weights 705 for each asset class 701. In one embodiment, the strategic component 703 represents 75% of the overall investment strategy of a fund (e.g., 75% of incoming cash or other investment is invested strategically), however this percentage can be modified as desired. Determination of the strategic asset class weights 705 is discussed below with reference to FIG. 8.

Strategic asset class weights 705 are used to modify 711 the mix of assets in a fund 713 to produce a modified asset mix for a fund 715. Based on this modified asset mix 715, assets in the fund are bought or disposed of on the open market to conform to the strategic asset mix 705. New investments coming into the fund (e.g., cash, contributions, electronic funds) are also allocated according to the strategic asset mix 715. The strategic investment component (701, 703, 705) can be repeated in order to process a plurality of funds.

Strategic asset class weights 705 are used to determination a tactical investment strategy 707. In one embodiment, the tactical component 707 represents 25% of the overall investment strategy of a fund (e.g., 25% of incoming cash or other investment is invested tactically), however this percentage can be modified as desired. The tactical investment component can be repeated in order to process a plurality of funds. The tactical component 707 is optional. Determination of tactical investments 709 is discussed below with reference to FIG. 9.

Figure 8:
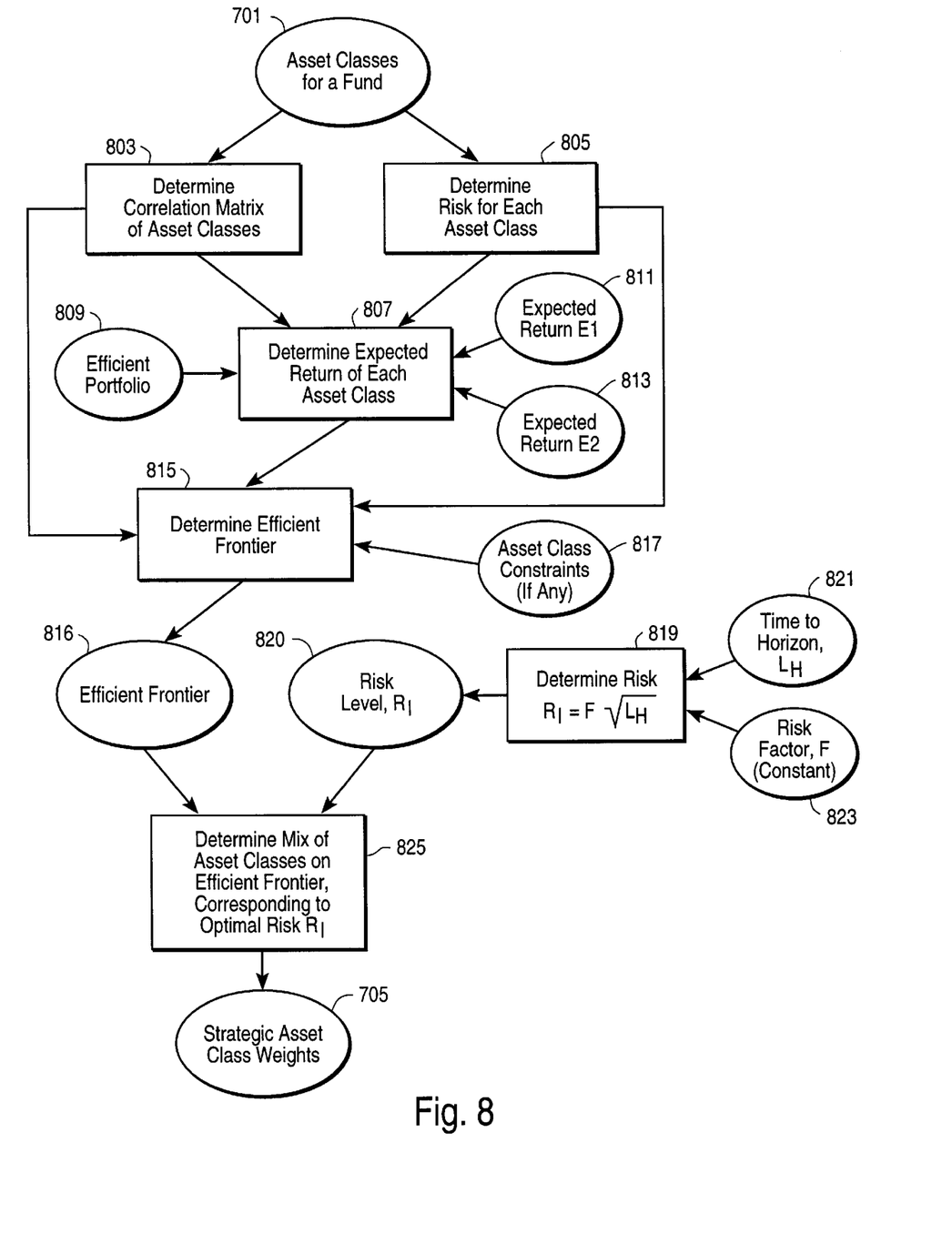
FIG. 8 is a flow chart of the determination of strategic asset class weights.

FIG. 8 is a flowchart illustrating the determination of the strategic asset class mix weights 703. A correlation matrix is conventionally determined 803 for the asset classes in a fund 701 (e.g., assets listed in Table I). In one embodiment, the monthly returns (equal weighted) for the previous ten calendar years (120 months) of each asset class 701 are used to determine a conventional correlation matrix 803. In a preferred embodiment, correlation matrix 803 is updated on an annual basis.

The risk of each asset class 701 is conventionally determined 805 using the standard deviation of the monthly returns (equal weighted) for the previous ten calendar years (120 months) of the asset class 701. In a preferred embodiment, the risk estimates 805 are updated on an quarterly basis.

Implied expected returns for each asset class are determined 807 conventionally using zero beta CAPM (Capital Asset Pricing Model). Given the expected risk 805 of each asset class, the correlation matrix 803, an efficient portfolio 809, and the expected returns on two asset classes ($E_1$, $E_2$) 811, 813, the implied expected returns, $E_i$, for each asset class 701, i, can be calculated as follows:

$$E_i = z + \beta_i * p$$

where
    $E_i$=the expected return of asset class i
    $\beta_i$=the beta of asset class i
    $p=(E_1-E_2)/(\beta_1-\beta_2)$ and
    $z=E_1-\beta_1*p$ $\beta_i$ for all i classes 701 is known from the covariances and variances of each asset class in the correlation matrix 803. In one embodiment, the expected return of one known asset class, E1, can be estimated using a conventional dividend discount model (DDM is the consensus expected dividend to calculate the expected return of the security) and attributing it to the Large Value asset class. The second known expected return, E2, can then be estimated using the average historical spread between stocks and bonds to determine an estimate of the equilibrium spread between stocks and the Long Governments asset class. For example, if the historical spread is 3.00%, the expected return for the Long Government asset class is equal to the expected return for the Large Value asset class minus 3.00%.

A proxy for an efficient portfolio 809 is the average strategic asset mix of several (e.g., twelve) large defined benefit plans (e.g., with combined total assets of $250 billion) sampled annually. It is assumed that these plans are a good proxy for a sophisticated investor. At the broad asset class category level (see Table I categories of asset classes) this 'sophisticated investor' efficient portfolio mix as of Dec. 31, 1993 was 51.1% domestic equity, 19.3% international equity, 27.3% domestic bonds and 2.3% international bonds. Within the domestic asset classes (equity and bonds) these broad asset classes are sub-divided into the asset classes 701 based on relative market capitalization. For international equity, the relative weights are 75% EAFE ex-Japan and 25% Japan to reflect the underweighting (relative to market-capitalization) of Japan in US institutional equity portfolios. It is estimated that 20% of international equity exposure is indexed and 80% is actively managed. Using a market capitalization weighting of 45% for the indexed component and a weighting of 20% for the average active equity manager, the Japan weighting is 25% for the average US institutional investor.

Given the inputs of an asset class correlation matrix 803, asset class risks 805, and asset class expected returns 807, an efficient frontier 815 is conventionally determined using a mean/variance optimizer. The efficient frontier 816 represents the optimal mix of a given set of asset classes for any given desired risk, R, of investment. Each point on efficient frontier 815 represents a portfolio or mix of assets whose expected return is the highest for that given level of risk. A commercially available product, such as Ibbottson Associates' EnCORR/Optimizer can be used to calculate efficient frontier 815.

In a preferred embodiment, constraints 817 on selected asset classes can be imposed during the calculation of efficient frontier 815 such that an optimal class weight mix does not recommend more than a specified percent of the selected asset class. Asset class constraints 817 are generally only implemented in the strategic investment strategy component. For example, in a preferred embodiment, an international constraint is imposed so that no more that 26% (0.26 weight) is allocated to international assets, and, no more than 15% (0.15 weight) is allocated to cash:

international constraint:

$$W_{Japan} + W_{EAFE-ex\ Japan} + W_{intl\ bonds} \leq 0.26\ (26\%)$$

cash constraint:

$$W_{cash} \leq 0.15\ (15\%)$$

Before, after or during the calculation of the efficient frontier 815, the optimal risk level, $R_f$, 820 is determined 819. As discussed above with reference to FIGS. 5A–5D, the risk level, $R_f$, generally decreases as a function of $L_H$ the length of time remaining between the present time and the time horizon $H_t$ 821. If returns are independent across time, then risk (standard deviation annualized) will change with the square root of time.

$$R_f = \sqrt{L_H} * F$$

where $L_H$=time in years to the maturity of the fund (821), and F=a constant risk factor (823). The constant risk factor, F, 823 is determined such that the recommended mix is 100% equity allocated across several domestic and international equity asset classes at the beginning of a fund (e.g., $L_H$=50); and the allocation is 20% equities at the mature state (e.g., $L_H$=0 or $L_H$=4). In one embodiment, F=2.15. If asset class risk levels or final desired allocations change then F should be adjusted.

In one embodiment $L_H$ 821 is equal to 50 at the inception of a fund, and for the mature state it is assumed to be 4 years. This is to ensure that the allocation at the mature state has approximately 20% equities. Thus, $R_I = \sqrt{L_H} * F$          for $L_H$ = 50 to 5
$R_I = \sqrt{(5-((5-L_H)/5))} * F$          for $L_H$ < 5

The strategic asset class mix or weights 705 for a given fund is determined 825 by finding the mix on the efficient frontier 815 corresponding to the optimal risk level, $R_I$, 819 for the fund. In one embodiment, strategic asset class weights 705 are modified such that the strategic component of the process (703, 705) accounts for a given percent of the overall investment strategy for a fund, e.g., 75 percent in a preferred embodiment. This step is accomplished conventionally by multiplying the strategic asset class weights by a factor less than 1 (e.g., 0.75).

Figure 9:
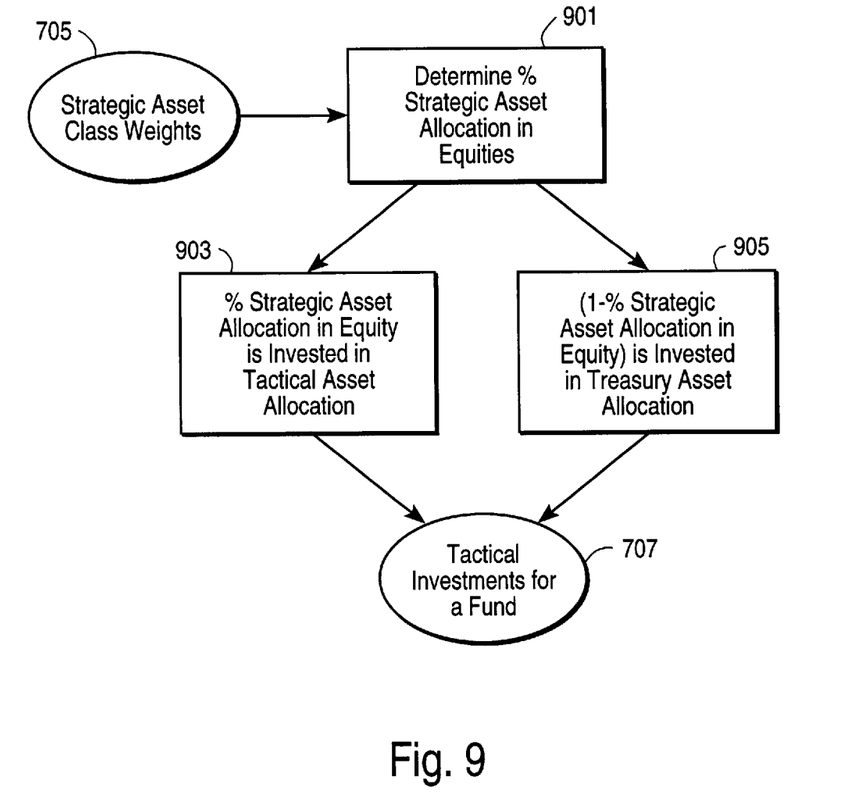
FIG. 9 is a flow chart of the determination of tactical investments.

FIG. 9 is a flowchart illustrating the determination of the tactical investment strategy 707. The tactical component 707 is designed to improve the fund performance by taking advantage of relative mis-pricing across asset classes. Markets are not assumed to be in equilibrium, and expected returns are updated daily. In one embodiment, a certain proportion of investments directed to a fund represent tactical investments, e.g, 25% in a preferred embodiment. The tactical component 707 is used to determine how to invest the 25%.

In one embodiment, the tactical investment component 707 of a fund is divided between two commercially available allocation strategies—the Wells Fargo U.S. Tactical Asset Allocation (100/0/0, stocks/bonds/cash, in normal market conditions) and the Wells Fargo U.S. Treasury Asset Allocation (bonds, notes, cash). The strategic asset class weights 705 are used to determine 901 how much should be invested according to the Tactical Asset Allocation 903, and how much should be invested according to the Treasury Asset Allocation 905. In this embodiment, the percent of strategic asset class weights 705 allocated to equities (e.g., the weights allocated to asset style indices or asset classes under the Domestic Equity and International Equity categories, plus Intermediate Corporate, Long Corporate, Mortgage Backed Securities, and Cash—see Table I above) is invested according to the Tactical Asset Allocation 903, while the percent of strategic asset class weights allocated to non-equities (e.g., (100- % equity) or the percent in International Fixed Income, Intermediate Government, Long Government, and Salomon non-US WGBI—see Table I above) is invested according to the Treasury Asset Allocation 905.

The Tactical Asset Allocation comprises the following indexes for given asset class categories:

| Asset Class | Index |
| --- | --- |
| Stocks | S&P 500 Index |
| Bonds | Lehman Brothers 20+ Treasury Bond Index |
| Cash | MOEBT |

The U.S. Treasury Asset Allocation strategy comprises the following indexes for given asset class categories:

| Asset Class | Index |
| --- | --- |
| Bonds | Lehman Brothers 20+ Treasury Bond Index |
| Notes | Lehman Brothers 5–7 year Treasury Index |
| Cash | Treasury Bills |

What is claimed is:

1. A computer system for managing assets in each of a plurality of investment funds, the system comprising:
a processor for executing programmed instructions and for storing and retrieving data;
program memory, coupled to the processor, for storing program instructions for execution by the processor;
an output device, coupled to the processor, for displaying data;
an input device, coupled to the processor, for accepting input data associated with each investment fund for storage in the memory, including:
a time horizon for each investment fund, and
an actual investment mix among the assets in each investment fund; and
an investment program, stored in the memory and executable on the processor, for automatically and periodically:
determining for each investment fund a current risk level for the investment fund as a function of the time horizon and a current date, the current risk level determined by:

$$R_I = \sqrt{L_H F} \qquad \text{for } T_1 < L_H \leq T_2$$

$$R_I = \sqrt{\left(T_1 - \frac{T_1 - L_H}{T_1}\right) F} \qquad \text{for } L_H \leq T_1$$

where $R_I$ is the current risk level;
$L_H$ is a length of time to the time horizon;
F is a constant risk factor selected for a predetermined maximum amount of risk; and
$T_1$ and $T_2$ are times;
determining a risk adjusted asset mix for each investment fund as a function of the current risk level, and
modifying the investment mix of each investment fund as a function of the risk adjusted asset mix.

2. The system of claim 1, wherein the asset mix is a strategic asset mix limited to assets for markets assumed to be in equilibrium, further comprising:
a tactical investment program, stored in the memory and executable on the processor, for:
determining a tactical investment mix for the fund as a function of the strategic asset mix, the tactical investment mix consisting of assets for markets assumed to not be in equilibrium; and
modifying the investment mix of the fund as a function of the tactical investment mix.

3. A computer implemented method for managing assets in an investment fund using a computer comprising a processor, storage, and a memory, the method comprising the steps of:
establishing, via the processor, an investment fund, the investment fund having an actual asset allocation including a plurality of assets, a time horizon defining a maturity date for the investment fund, each asset in the asset allocation being a member of an asset class, each asset class having an asset class weight;

periodically determining, via the processor, a current risk level for the investment fund as a function of the time horizon and a current date, the current risk level determined by:

$$R_I = \sqrt{L_H F} \quad \text{for } T_1 < L_H \leq T_2$$

$$R_I = \sqrt{\left(T_1 - \frac{T_1 - L_H}{T_1}\right) F} \quad \text{for } L_H \leq T_1$$

where $R_I$ is the current risk level;
$L_H$ is a length of time to the time horizon;
F is a constant risk factor selected for a predetermined maximum amount of risk; and
$T_1$ and $T_2$ are times;

periodically determining, via the processor, a risk adjusted asset allocation for the investment fund by determining a current asset weight for each asset class in the asset allocation as a function of the current risk level; and purchasing or disposing of assets in each asset class of the fund to match the actual asset allocation of the investment fund to the risk adjusted asset allocation of the investment fund.

4. The method of claim 3 wherein the asset classes include equity asset classes and income asset classes, and determining the current risk level further comprises:

determining the current risk level as a function of a risk factor, the risk factor allocating a majority of the assets in the risk adjusted asset allocation to the equity asset classes when the time horizon is greater than a first predetermined amount of time, and allocating a majority of the assets in the risk adjusted asset allocation to the income asset classes when the time horizon is less than a second predetermined amount of time, where the first predetermined amount of time is greater than the second predetermined amount of time.

5. The method of claim 3, wherein the step of periodically determining, via the processor, a risk adjusted asset allocation further comprises:

constraining the asset weight of at least one asset class to being less than a predetermined percentage of a total of the asset weights for all asset classes in risk adjusted asset allocation.

6. The computer-implemented method of claim 3 wherein there are a plurality of investment funds, the method further comprising:

periodically and regularly repeating all steps for each investment fund.

7. The computer-implemented method of claim 3 further comprising the steps of:

allocating a first portion of the actual asset allocation to a strategic investment component limited to asset classes for markets assumed to be in equilibrium;

allocating a second, remaining portion of the actual asset allocation to a tactical investment component limited to asset classes for markets assumed to not be in equilibrium, the tactical investment component having at least an equity asset allocation and an income asset allocation;

determining, via the processor, an adjusted tactical investment allocation within the tactical investment component by:

allocating to the equity asset allocation a first portion of the tactical investment component corresponding to a portion of the strategic investment component allocated to equity asset classes; and allocating to the income asset allocation a second portion of the tactical investment component corresponding to a portion of the strategic investment component allocated to income asset classes; and purchasing or disposing of assets in the tactical investment component to match the adjusted tactical investment allocation.

8. The computer-implemented method of claim 7 wherein there are a plurality of investment funds, the method further comprising:

periodically and regularly repeating all steps for each investment fund.

9. The method of claim 7 wherein the asset classes include equity asset classes and income asset classes, and the step of determining the current risk level further comprises:

determining the current risk level as a function of a risk factor, the risk factor allocating a majority of the assets in the strategic investment component to the equity asset classes when the time horizon is greater than a first predetermined amount of time, and allocating a majority of the assets in the strategic investment component to the income asset classes when the time horizon is less than a second predetermined amount of time, where the first predetermined amount of time is greater than the second predetermined amount of time.

10. The computer-implemented method of claim 7 wherein the step of determining a tactical investment allocation comprises:

allocating E percent of the assets of the tactical investment component to the equity asset allocation, where E is equal to a percent of the strategic asset allocation allocated to equity asset classes; and allocating (1-E) percent of the assets of the tactical investment component to the income asset allocation.

11. The computer-implemented method of claim 3 further comprising the steps of:

distributing a second, remaining portion of the assets to a tactical investment component limited to asset classes for markets assumed to not be in equilibrium, the tactical investment component having at least an equity asset allocation and an income asset allocation;

determining, via the processor, an adjusted tactical investment allocation for the fund by:

allocating to the equity asset allocation E percent of the tactical investment component corresponding to a percent of the strategic investment component allocated to equity asset classes; and allocating to the income asset allocation (1-E) percent of the tactical investment component to the income asset allocation;

modifying, via the processor, the investment mix of the fund as a function of the tactical investment mix; and purchasing or disposing of assets in the tactical investment component to match the adjusted tactical investment allocation.

12. A computer implemented method for managing a plurality of investment funds, each investment fund having a time horizon defining a maturity of the investment fund, and an actual investment allocation of the assets in the investment fund, the method comprising:

automatically and periodically determining for each investment fund a risk level for the investment fund as a function of its time horizon and a current date, the risk level determined by:

$$R_I = \sqrt{L_H F} \quad \text{for } T_1 < L_H \leq T_2$$

$$R_I = \sqrt{\left(T_1 - \frac{T_1 - L_H}{T_1}\right) F} \quad \text{for } L_H \leq T_1$$

where $R_I$ is the risk level;
$L_H$ is a length of time to the time horizon;
F is a constant risk factor selected for a predetermined maximum amount of risk; and
$T_1$ and $T_2$ are times;
automatically and periodically computing a risk adjusted asset allocation for the assets of each investment fund as a function of the risk level; and
modifying the actual investment allocation of each investment fund to match the risk adjusted asset allocation for the investment fund.

13. The method of claim 12, wherein the step of automatically and periodically computing a risk adjusted asset allocation for each investment fund further comprises:
automatically and periodically computing a strategic asset allocation for each investment fund as a function of the risk level, the strategic asset allocation consisting of a first type of assets of the actual investment allocation in markets assumed to be in equilibrium;
automatically and periodically determining a tactical investment allocation for each investment fund as a function of the strategic asset allocation, the tactical investment allocation consisting of a second type of assets in the actual investment allocation in markets assumed to not be in equilibrium; and
modifying the actual investment allocation, of the fund by purchasing or disposing of first type assets to match the strategic investment allocation and purchasing or disposing of second type assets to match the tactical investment allocation.

14. The method of claim 13, further comprising:
determining the risk level as a function of a risk factor, the risk factor causing the strategic investment allocation to allocate a majority of the assets to the equity asset classes when the time horizon is greater than a first predetermined amount of time, and causing the strategic investment allocation to allocate a majority of the assets to the income asset classes when the time horizon is less than a second predetermined amount of time.

15. In a computer system, including a processor and a memory, an investment program stored in the memory and executable by the processor for managing assets in each of a plurality of investment funds stored in the system, the investment program comprising:
an investment program that accepts a time horizon for each investment fund and an actual investment allocation among the assets in each investment fund, and that automatically and periodically:
determines for each investment fund a risk level for the investment fund as a function of the time horizon and a current date the risk level determined by:

$$R_I = \sqrt{L_H F} \quad \text{for } T_1 < L_H \leq T_2$$

$$R_I = \sqrt{\left(T_1 - \frac{T_1 - L_H}{T_1}\right) F} \quad \text{for } L_H \leq T_1$$

where $R_I$ is the risk level;
$L_H$ is a length of time to the time horizon;
F is a constant risk factor selected for a predetermined maximum amount of risk; and
$T_1$ and $T_2$ are times;
determines a risk adjusted asset allocation for each investment fund as a function of the risk level; and
modifies the actual investment allocation of each investment fund to match the risk adjusted asset allocation.

16. A computer implemented method for managing an investment fund having a time horizon defining a maturity of the investment fund, and an actual investment allocation of the assets in the investment fund, the method comprising:
automatically and periodically determining a risk level for the investment fund as a function of the time horizon and a current date, the risk level determined by:

$$R_I = \sqrt{L_H F} \quad \text{for } T_1 < L_H \leq T_2$$

$$R_I = \sqrt{\left(T_1 - \frac{T_1 - L_H}{T_1}\right) F} \quad \text{for } L_H \leq T_1$$

where $R_I$ is the risk level;
$L_H$ is a length of time to the time horizon;
F is a constant risk factor selected for a predetermined maximum amount of risk; and
$T_1$ and $T_2$ are times;
automatically and periodically computing a risk adjusted asset allocation for the assets of the investment fund as a function of the risk level; and
modifying the actual investment allocation of the investment fund to match the risk adjusted asset allocation for the investment fund.

* * * * *

UNITED STATES PATENT AND TRADEMARK OFFICE
CERTIFICATE OF CORRECTION

PATENT NO. : 5,812,987
DATED : September 22, 1998
INVENTOR(S) : Donald L.Luskin and Lawrence G. Tint It is certified that error appears in the above-identified patent and that said Letters Patent is hereby corrected as shown below:

Column 7, line 60, replace "returns risks," with --returns, risks,--.

Signed and Sealed this

Thirtieth Day of March, 1999

*Attest:*

Q. TODD DICKINSON

*Attesting Officer*     *Acting Commissioner of Patents and Trademarks*